United States Patent
Itoh et al.

(10) Patent No.: US 6,725,651 B2
(45) Date of Patent: Apr. 27, 2004

(54) REDUCING AGENT FOR EMISSION CONTROL SYSTEM, REDUCING-AGENT SUPPLY DEVICE, AND EMISSION CONTROL SYSTEM USING THE REDUCING AGENT

(75) Inventors: Kazuhiro Itoh, Mishima (JP); Toshiaki Tanaka, Numazu (JP); Shinya Hirota, Susono (JP); Koichiro Nakatani, Susono (JP); Shigeki Daido, Nishio (JP); Naohisa Oyama, Okazaki (JP)

(73) Assignees: Toyota Jidosha Kabushiki Kaisha, Toyota (JP); Nippon Soken, Inc., Nishio (JP)

( * ) Notice: Subject to any disclaimer, the term of this patent is extended or adjusted under 35 U.S.C. 154(b) by 0 days.

(21) Appl. No.: 09/987,191

(22) Filed: Nov. 13, 2001

(65) Prior Publication Data

US 2002/0056273 A1 May 16, 2002

(30) Foreign Application Priority Data

| Nov. 16, 2000 | (JP) | 2000-350167 |
| Feb. 15, 2001 | (JP) | 2001-039113 |
| Mar. 13, 2001 | (JP) | 2001-070706 |

(51) Int. Cl.$^7$ .............................. F01N 3/00
(52) U.S. Cl. ..................... 60/286; 60/274; 60/276; 60/295; 60/301; 422/172
(58) Field of Search .............. 60/274, 276, 286, 60/295, 301, 303; 44/301, 336, 387, 412, 417; 422/171, 172, 177; 252/182.11, 182.12, 182.34, 184, 190, 401; 564/63, 38, 555; 423/235

(56) References Cited

U.S. PATENT DOCUMENTS

| 2,657,984 | A | * | 11/1953 | Braithwaite, Jr. et al. .... 44/417 |
| 2,714,057 | A | * | 7/1955 | Chenicek ..................... 44/336 |
| 4,325,924 | A | | 4/1982 | Arand et al. |
| 4,469,648 | A | | 9/1984 | Ferraris et al. |
| 5,162,049 | A | * | 11/1992 | Bostick et al. ................. 44/336 |
| 5,453,257 | A | | 9/1995 | Diep et al. |
| 5,746,783 | A | * | 5/1998 | Compere et al. ............. 44/301 |
| 5,809,774 | A | * | 9/1998 | Peter-Hoblyn et al. ....... 60/286 |
| 5,809,775 | A | * | 9/1998 | Tarabulski et al. ............ 60/274 |
| 5,813,224 | A | * | 9/1998 | Rao et al. ..................... 60/286 |
| 6,110,435 | A | * | 8/2000 | Lehner et al. ............... 423/235 |
| 6,199,375 | B1 | * | 3/2001 | Russell .......................... 60/286 |
| 6,357,227 | B1 | * | 3/2002 | Neufert ........................ 60/295 |
| 6,387,138 | B1 | * | 5/2002 | Murayama et al. ........... 44/387 |
| 6,387,336 | B2 | * | 5/2002 | Marko et al. ................. 60/286 |

FOREIGN PATENT DOCUMENTS

| EP | 199 12 374 C1 | 3/2000 |
| GB | 714327 | 8/1954 |
| JP | 01082571 | 3/1989 |
| JP | 04098655 | 3/1992 |
| JP | A 7-323216 | 12/1995 |
| JP | A 2000-27626 | 1/2000 |

* cited by examiner

Primary Examiner—Thomas Denion
Assistant Examiner—Tu M. Nguyen
(74) Attorney, Agent, or Firm—Oliff & Berridge, PLC (57) ABSTRACT

A reducing agent for use in an internal combustion engine is a mixture of an ammonia-derived solid reducing material and a water-insoluble liquid in which the solid reducing agent is immersed. A reducing-agent supply device is provided for supplying a denitration catalyst with the reducing agent, such that the reducing agent is introduced into a portion of an exhaust passage of the internal combustion engine which is upstream of the denitration catalyst.

17 Claims, 7 Drawing Sheets

REDUCING AGENT FOR EMISSION CONTROL SYSTEM, REDUCING-AGENT SUPPLY DEVICE, AND EMISSION CONTROL SYSTEM USING THE REDUCING AGENT

INCORPORATION BY REFERENCE

The disclosures of Japanese Patent Applications No. 2000-350167, No. 2001-039113 and No. 2001-070706, each including the specification, drawings and abstract, are each incorporated herein by reference in its entirety.

BACKGROUND OF THE INVENTION

1. Field of Invention

The invention relates to a reducing agent. The invention also relates to an emission control system that uses the reducing agent for removing or reducing NOx contained in an exhaust gas emitted from an internal combustion engine.

2. Description of Related Art

NOx catalysts of selective-reduction type are widely used in emission control systems arranged to remove or reduce NOx in exhaust gas emitted from an internal combustion engine (e.g., a diesel engine or a lean-burn gasoline engine) that is operable at a lean air/fuel ratio (higher than the stoichiometric value). Such NOx catalysts of selective-reduction type use a reducing agent for reducing or decomposing harmful NOx in the exhaust emission, under an oxygen-rich atmosphere.

The NOx catalyst of selective-reduction type as described above commonly employs hydrocarbon as the reducing agent. However, it has been proposed to use other kinds of reducing agents, such as urea and other ammonia-derived reducing agents. JP-A-7-323216 discloses an exemplary reducing-agent supply device using solid urea as the reducing agent.

In the reducing-agent supply device disclosed in JP-A-7-323216, a fuel-burning layer of catalyst is disposed in a portion of an exhaust passage, which is upstream of a denitration device. When a combustion device (engine) is started, fuel is sprayed for combustion in a portion of the exhaust passage upstream of the fuel-burning catalyst layer. The supply of the fuel is terminated when the temperature of the denitration device has reached a predetermined value. Then, the reducing-agent supply device introduces a solid or liquid reducing agent into a portion of the exhaust passage upstream of the fuel-burning catalyst layer. The above-identified publication teaches the use of a powdered reducing agent, such as melamine, urea and cyanuric acid.

With the powdered reducing agent sprayed over the fuel-burning catalyst layer, the reducing agent is vaporized for denitration reaction with NOx in the exhaust gas, whereby NOx in the exhaust gas is converted into nitrogen.

The denitration device for denitration of the exhaust gas as disclosed in the publication JP-A-7-323216 uses a solid reducing agent stored in a storage tank. Where solid urea alone is used as the solid reducing material, the solid urea agglomerates as a result of absorption of an aqueous component during the storage in the tank, and therefore suffers from a low degree of mobility and difficult control of the amount of supply from the tank.

In the case where a catalytic device for converting $NH_3$ into NO is present in the exhaust passage, the introduction of a reducing agent such as solid urea to a portion of the passage upstream of the catalytic device causes oxidization of the reducing agent due to its flow through the catalytic device. As a result, the reducing agent is not able to reduce or remove NOx in the exhaust gas at the catalyst of the denitration device disposed downstream of the catalytic device. Accordingly, the portion of the exhaust passage into which the reducing agent is introduced must be determined depending upon the specific position of the catalytic device in the exhaust passage.

SUMMARY OF THE INVENTION

It is therefore a first object of the invention to provide a solid reducing material that does not agglomerate during storage and supply.

A second object of this invention is to provide an emission control system including a reducing-agent supply device, which permits efficient introduction of a solid reducing agent.

A third object of the invention is to provide an emission control system including a reducing-agent supply device, which uses a reducing agent that does not agglomerate during storage and supply, and which is capable of introducing the reducing agent into a portion of an exhaust system of an internal combustion engine, such that the introduction of the reducing agent into that portion of the exhaust system does not deteriorate the exhaust emission of the engine.

To accomplish the first object indicated above and/or other objects, there is provided according to a first aspect of the invention a reducing agent comprising a mixture of an ammonia-derived solid reducing material and a water-insoluble liquid in which the solid reducing agent is immersed or dispersed.

The ammonia-derived solid reducing material may be urea, biuret or ammonium carbamate, for example.

The solid reducing material may be in a powdered or pelletized form. The particle or pellet size of the solid reducing material is desirably selected for easy handling by an associated system or device, and is preferably not larger than about 3.0 mm.

The water-insoluble liquid may be selected from a wide variety of mineral oils and plant oils. Examples of the mineral oils include light oil, kerosene, gasoline and silicone oil. Examples of the plant oils include rapeseed oil, coconut oil and eucalyptus oil. At least one of the mineral and plant oils may be used as the water-insoluble liquid. A mixture of two or more mineral and/or plant oils may be used as the water-insoluble liquid, as long as the mixture is possible.

Any water-insoluble liquid may be used as long as the water-insoluble liquid does not dissolve the solid reducing material within the mass of the liquid, and does not have an adverse influence on a catalyst to which the solid reducing material is to be applied. Where the reducing material is used for a catalyst for purifying exhaust gases emitted from an internal combustion engine, a fuel, such as gasoline or light oil used by the engine, is preferably used as the water-insoluble liquid for easy handling.

The temperature of the mixture is preferably lower than an upper limit above which the solid reducing material is fused or melted. This limitation of the temperature is desirable to assure easy control of introduction of the mixture and to effectively introduce only the solid reducing material.

Described in detail, the temperature of the mixture during storage or supply is lower than the lower one of (i) the boiling point of the water-insoluble liquid and (ii) the fusing or melting point of the solid reducing agent. Where the mixture includes solid urea as the solid reducing material and light oil as the water-insoluble liquid, the boiling point of the light oils ranges from about 250° C. to about 350° C. while the fusing point of the solid urea is about 130° C., so that the temperature of the mixture is preferably held below the fusing point of the solid urea.

The water-insoluble liquid preferably has a lower specific gravity than the solid reducing material, so that the solid reducing material does not float on, or entirely exist adjacent to the surface of, a mass of the water-insoluble liquid, but is distributed or dispersed within or throughout the mass of the water-insoluble liquid, in order to prevent agglomeration of the solid reducing material into a large solid mass or to improve the ease of handling of the reducing material.

A solid reducing agent stored in a suitable storage device may be fed by any suitable feeding device into another storage device provided with a suitable heater for liquefying the solid reducing agent, so that the resulting liquid reducing agent is introduced by a suitable introducing device into a portion of an exhaust passage, which is upstream of an NOx catalyst of selective-reduction type.

The internal combustion engine for which the reducing agent is used according to the invention may be a lean-burn gasoline or diesel engine of direct fuel injection type, for example.

The NOx catalyst of selective-reduction type may include a substrate formed of zeolite and an ion-exchanged transition metal carried on the substrate. The NOx catalyst may alternatively include a substrate formed of zeolite or alumina and a noble metal carried by the substrate.

The solid reducing agent may be introduced at a desired rate into an exhaust passage by a suitable supplier such as an injector, which is controlled by a suitable control device, for example, an electronic control unit (ECU) generally used for controlling an internal combustion engine. The solid reducing agent to be injected into the exhaust passage need not be liquefied or gasified (vaporized), but may be fluidized while remaining in a solid state. Alternatively, the solid reducing agent in a powdered form may be introduced into the exhaust passage.

In the first aspect of the invention, the solid reducing material is stored as a mixture with the water-insoluble liquid, as described above, so that the solid reducing material does not absorb an aqueous component contained in the air, and the particles or pellets of the solid reducing material do not agglomerate into a large solid mass. In addition, the reducing agent has a high degree of mobility for easy introduction into the exhaust passage, in the presence of the water-insoluble liquid.

To accomplish the second object and/or other object(s), there is provided according to a second aspect of the invention a reducing-agent supply device for an internal combustion engine, for supplying a denitration catalyst with a reducing agent. The reducing agent comprises a mixture of an ammonia-derived solid reducing material and a water-insoluble liquid. The reducing-agent supply device is operable to introduce the reducing agent into a portion of an exhaust passage of the internal combustion engine which is upstream of the denitration catalyst. The denitration catalyst is arranged to induce a reaction between NOx and ammonia ($NH_3$), for promoting the conversion of NOx into nitrogen ($N_2$). For example, the denitration catalyst includes a substrate formed of titania, and molybdenum oxide or vanadium oxide carried on the titania substrate.

When the exhaust passage of the internal combustion engine has only the denitration catalyst, the reducing agent is introduced into a portion of the exhaust passage between the internal combustion engine and the denitration catalyst. In this case, there is induced a reaction between the reducing agent and NOx contained in the exhaust gas, so that NOx is converted into harmless nitrogen.

When a catalyst for converting $NH_3$ into NO is disposed in a portion of the exhaust passage between the internal combustion engine and the denitration catalyst, the reducing agent is introduced into a portion of the exhaust passage between the above-indicated converting catalyst and the denitration catalyst. In this case, the reducing agent is applied to the downstream denitration catalyst, without oxidization by the converting catalyst, so that a denitration reaction is induced at the denitration catalyst, between the reducing agent and NOx in the exhaust gas.

The catalyst for converting $NH_3$ into NO is disposed in a relatively upstream portion of the exhaust passage. The catalyst may be an oxidizing catalyst, a three-way catalyst, an NOx catalyst of occlusion-reduction type, an NOx catalyst of selective-reduction type, a DPR, DPNR or an adsorption catalyst.

The oxidizing catalyst is arranged to oxidize HC and CO in the exhaust gas, into $H_2O$ and $CO_2$. The three-way catalyst is arranged to perform the function of the oxidizing catalyst, and is at the same time capable of reducing NOx in the exhaust gas when the exhaust gas is produced as a result of combustion of an air-fuel mixture having the stoichiometric air/fuel ratio. Thus, the three-way catalyst is capable of converting the three harmful gas components into harmless $CO_2$, $H_2O$ and $N_2$.

The NOx catalyst of occlusion-reduction type is arranged to absorb NOx when the exhaust gas has a lean air/fuel ratio, and releases the absorbed NOx for reduction into $N_2$ when the oxygen concentration of the exhaust gas is lowered.

The NOx catalyst of selective-reduction type is arranged to reduce or decompose NOx in the presence of HC in the oxygen-rich atmosphere.

The DPR (Diesel Particulate Reactor) or DPNR (Diesel Particulate NOx Reduction) is a particulate filter carrying an active-oxygen releasing agent, for oxidizing particulate deposited on the particulate filter. Further, the DPR or DPNR is capable of absorbing NOx when the exhaust gas has a lean air/fuel ratio, and releasing the absorbed NOx for reduction into $N_2$ when the oxygen concentration of the exhaust gas is lowered.

To accomplish the above-indicated third object and/or other object(s), there is provided according to a third aspect of the invention an emission control system for an internal combustion engine. The system includes (a) a denitration catalyst disposed in an exhaust passage of the internal combustion engine, to reduce or decompose NOx, and (b) a reducing-agent supply device disposed near the exhaust passage. The reducing-agent supply device is operable to introduce a controlled amount of a reducing agent into the exhaust passage for use with the denitration catalyst. The reducing agent comprises a mixture of an ammonia-derived solid reducing material and a water-insoluble liquid. In this system, the reducing-agent supply device introduces the reducing agent into the exhaust passage when a first purification percentage representing a capability of the denitration catalyst to remove the water-insoluble liquid is greater than a threshold value.

Preferably, the introduction of the reducing agent into the exhaust passage is initiated when a second purification percentage representing a capability of the denitration catalyst to remove HC and a third purification percentage representing a capability of the denitration catalyst to remove NOx, in addition to the first purification percentage, are greater than respective threshold values. The purification percentage of each of the water-insoluble liquid, HC, and NOx may be determined on the basis of the detected temperature of the exhaust gas or denitration catalyst.

The denitration catalyst is arranged to induce a reaction between NOx and ammonia ($NH_3$), for promoting the conversion of NOx into nitrogen ($N_2$). For instance, the denitration catalyst includes a substrate formed of titania, and a molybdenum oxide or vanadium oxide carried on the titania substrate.

The arrangement can prevent the introduction of the reducing agent before the temperature of the exhaust gas has reached a value above which the water-insoluble liquid can be removed from the exhaust gas, so that the water-insoluble liquid of the reducing agent does not pass through the denitration catalyst into the atmosphere. Where the introduction of the reducing agent is initiated when the purification percentages of the water-insoluble liquid, HC and NOx have all exceeded the predetermined values, the passage of not only the water-insoluble liquid, but also HC and NOx into the atmosphere, are prevented.

According to the principle of this invention described above, the solid reducing material is stored as a mixture with the water-insoluble liquid, so that the solid reducing material does not absorb an aqueous component contained in the air, and the particles or pellets of the solid reducing agent do not agglomerate into a large solid mass.

In addition, the water-insoluble liquid functions to improve the mobility of the reducing agent including the solid reducing material, so that the solid reducing material, such as solid urea, can be easily introduced into the exhaust passage. Further, the reducing agent can be introduced in an appropriate condition of the exhaust gas or denitration catalyst, so as to assure efficient removal of NOx from the exhaust gas.

BRIEF DESCRIPTION OF THE DRAWINGS

The foregoing and/or further objects, features and advantages of the invention will become more apparent from the following description of exemplary preferred embodiments with reference to the accompanying drawings, in which like numerals are used to represent like elements and wherein.

DETAILED DESCRIPTION OF PREFERRED EMBODIMENTS

Referring to the drawings, there will be described exemplary preferred embodiments of the invention as applied to a reducing agent used for an internal combustion engine in the form of a diesel engine for an automotive vehicle.

First Embodiment

Figure 1:
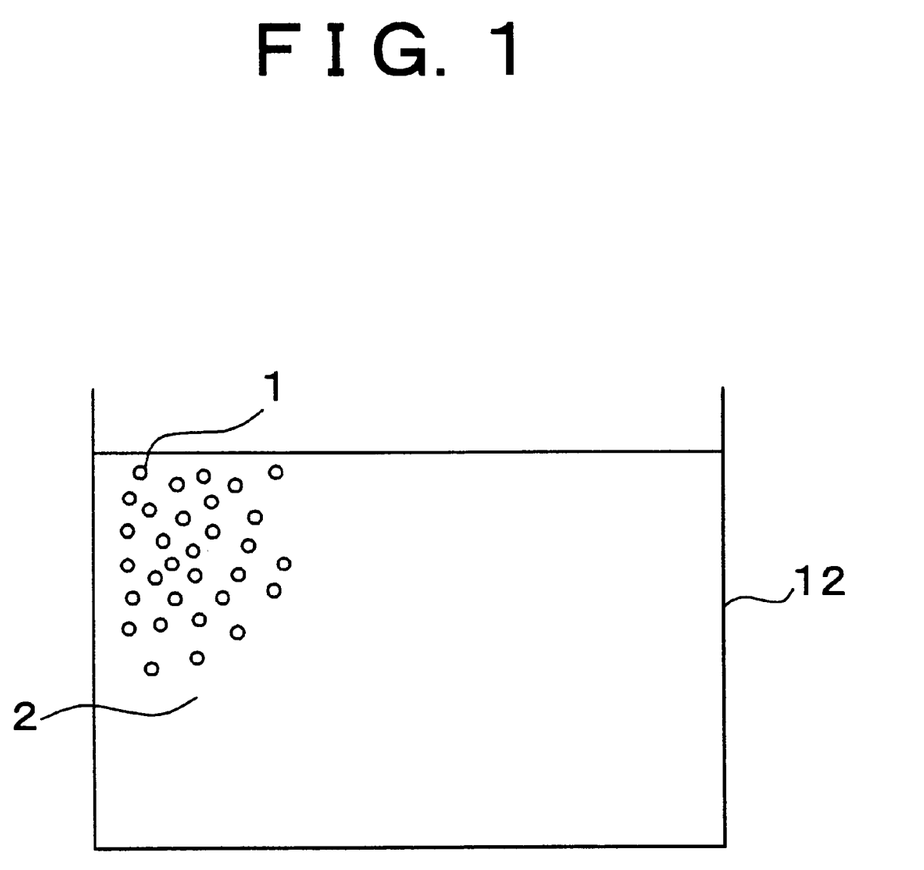
FIG. 1 shows a reducing agent including a solid reducing material according to an exemplary embodiment of the invention, when the reducing agent is stored in a storage container.

FIG. 1 shows an example of a reducing agent including solid urea 1 as an ammonia-derived reducing material. The solid urea 1 is in a powdered form and can typically have a particle size of, for example, about 5 $\mu$m. The reducing agent used in this embodiment is a mixture of the powdered solid urea 1 and light oil or gas oil 2 as a water-insoluble liquid. This mixture is stored in a storage container 12. Thus, the reducing agent including the solid reducing material in the form of the solid urea 1 is fluidized by the water-insoluble liquid in the form of the light oil 2. In other words, the mixture of the solid urea 1 and the light oil 2 is considered to be a fluidic mass or a fluidized mass.

The water-insoluble liquid preferably has a lower specific gravity than that (about 1.2) of the solid urea 1. In this example, the light oil 2 having a low specific gravity is used as the water-insoluble liquid. Accordingly, the solid urea 1 does not float on the surface of the light oil 2, but is distributed or dispersed within or throughout the light oil, such that the solid urea 1 and the light oil 2 cooperate to form an entirely uniform fluidic mixture.

In embodiments, ammonia-derived reducing materials other than solid urea may be used. For example, biuret and ammonium carbamate may be used. In this case, the water-insoluble liquid used in combination with these ammonia-derived reducing materials other than urea preferably has a specific gravity lower than those of the reducing materials used.

Figure 2:
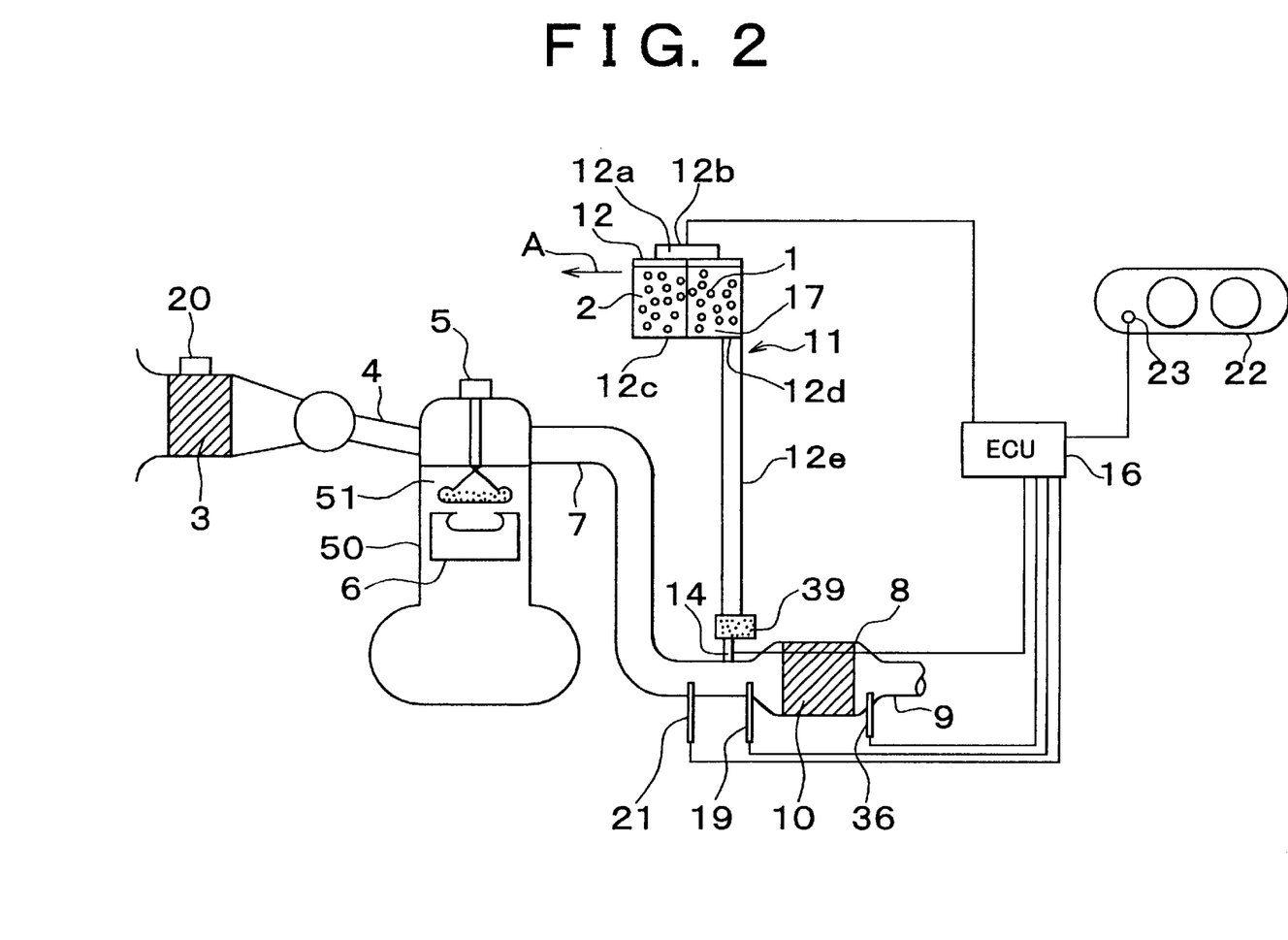
FIG. 2 is a schematic view illustrating an exemplary emission control system which uses the reducing agent as shown in FIG. 1.
Figure 3:
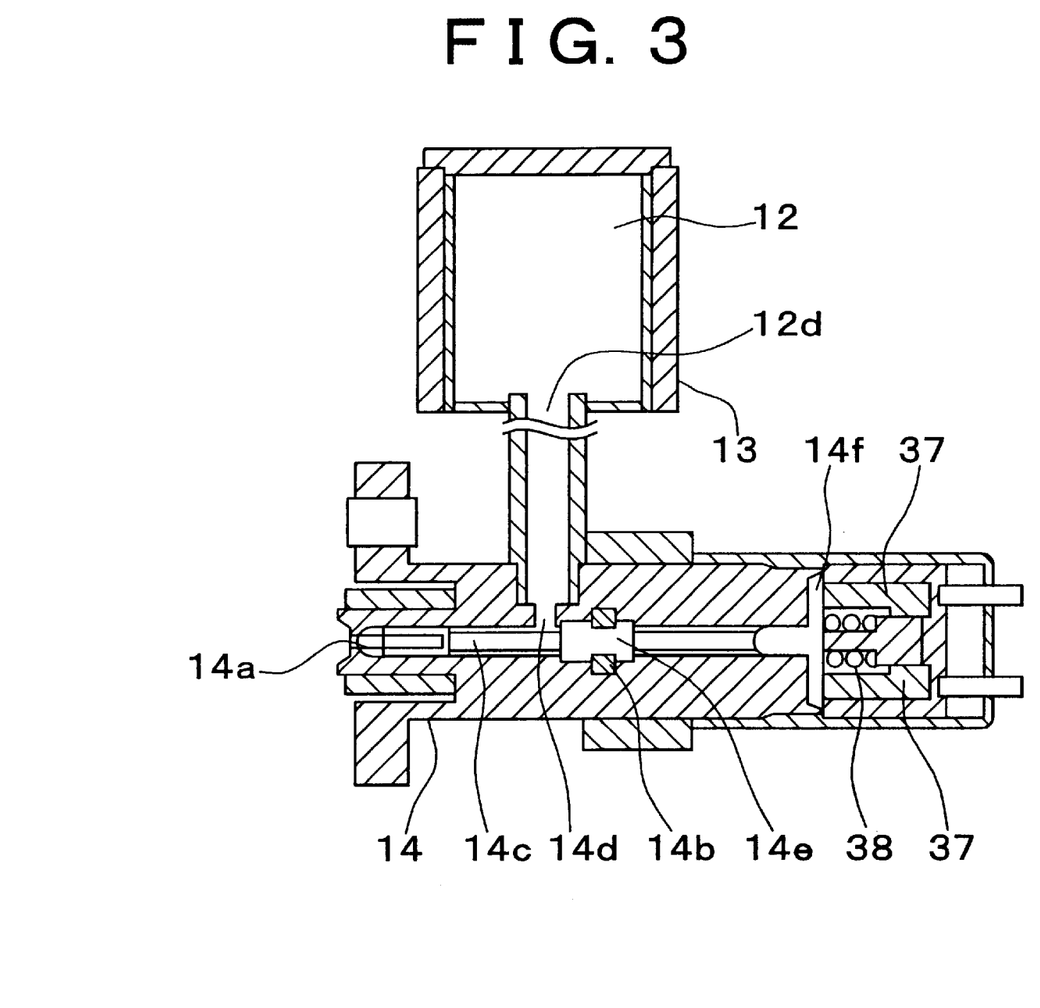
FIG. 3 is a schematic view in cross section showing a supply control valve for controlling the supply of the reducing agent.

Referring next to FIGS. 2 and 3, there will be described an example of an emission control system which uses the reducing agent as described above. The emission control system is provided for a diesel engine 50 including a plurality of cylinders each of which has a piston 6 partially defining a combustion chamber 51. Air is introduced through an intake pipe 4 into the combustion chamber 51 through an air cleaner 3. Fuel is injected through a fuel injection valve 5 into the combustion chamber 51, for combustion at a lean air/fuel ratio.

An exhaust gas emitted from each combustion chamber 51 is discharged into the atmosphere through an exhaust pipe 7, a NOx catalytic converter 8 and a downstream exhaust pipe 9. The NOx catalytic converter 8 houses a zeolite-silica-based NOx catalyst 10 of selective-reduction type for reducing or decomposing NOx in the exhaust gas, in the presence of a reducing agent.

The reducing agent enables the NOx catalyst 10 of selective-reduction type to reduce or remove NOx. To this end, the emission control system is provided with a reducing-agent supply device 11 located near the exhaust pipe 7, to introduce the reducing agent into the exhaust pipe 7 that is disposed upstream of the NOx catalytic converter 8.

The reducing-agent supply device 11 is arranged to introduce into the exhaust pipe 7 the reducing agent that is a fluidic mass or a fluidized mass including a mixture of the solid urea 1 and the light oil 2. The device 11 includes a reducing-agent storing portion provided by the storage container 12 for storing the reducing agent including the solid urea 1, and a supply control valve 14 which is disposed below the storage container 12 and is open to the exhaust pipe 7.

The storage container 12 has an inlet 12a, which is opened and closed by a lid 12b. As shown in FIG. 2, the storage container 12 has an outlet 12d formed through a bottom wall 12c. The outlet 12d is connected through a communication passage 12e to the supply control valve 14. The storage container 12 is of a cartridge type, and can be removed from a housing 13 (FIG. 3) when the storage container 12 is slidably moved in a direction indicated by arrow A in FIG. 2. When the reducing agent stored in the storage container 12 has been entirely consumed, the storage container 12 can be replaced with a new one filled with the reducing agent.

The housing 13 accommodating the storage container 12 is provided with a residue sensor 17 arranged to detect the amount of the reducing agent remaining in the storage container 12. The residue sensor 17 applies to an ECU 16 an output signal having a level proportional to the detected remaining amount of the reducing agent. When the remaining amount of the reducing agent as represented by the output signal of the residue sensor 17 is smaller than a predetermined threshold (hereinafter referred to as "alarming threshold"), the ECU 16 activates an alarm light 23 provided on a meter panel 22, informing that the remaining amount of the reducing agent has become smaller than the threshold.

When the ECU 16 receives an output signal of the residue sensor 17 indicating a lower limit value that is even smaller than the above-indicated alarming threshold, the ECU 16 turns off the reducing-agent supply device 11, so that the supply control valve 14 is fully closed to stop the introduction of the reducing agent.

In the example of FIG. 2, the reducing agent stored in the storage container 12 is a fluidized mass which is a mixture of the solid urea 1 and the light oil 2, as described above. Accordingly, the reducing agent including the solid urea 1 can flow downwards from the outlet 12d toward the supply control valve 14.

The reducing agent that is the mixture of the solid urea 1 and the light oil 2 is introduced into the exhaust pipe 7 while the rate of flow of the reducing agent into the exhaust pipe 7 is controlled by the supply control valve 14 as shown in FIG. 3. The supply control valve 14 has a needle valve 14a at one end thereof, and a supply passage 14d, which extends in an axial direction so as to receive a valve body 14c in the form of a spool and which is connected to the communication passage 12e extending from the storage container 12. The valve body 14c is guided by a guide 14e such that the valve body 14c is reciprocable. At the rear end of the supply control valve 14, there is provided a stopper 14f mounted on a rear end portion of the valve body 14c. The stopper 14f is normally held in contact with a rear end face of the body of the supply control valve 14. A solenoid coil 37 is disposed behind the stopper 14f. When the solenoid coil 37 is energized, the stopper 14f is attracted rearwards toward the solenoid coil 37.

The guide 14e for the valve body 14c is provided with a seal 14b on its outer circumferential surface, for preventing leakage of the supplied reducing agent.

The operation of the supply control valve 14 is controlled by the ECU 16. The energization of the solenoid coil 37 in response to a command received from the ECU 16 causes a reward movement of the stopper 14f and a consequent rearward movement of the valve body 14c, which in turn cause the needle valve 14a at the front end of the valve body 14c to be opened. As a result, the reducing agent is allowed to be introduced into the exhaust pipe 7 at a predetermined rate for a predetermined length of time. The rate of flow of the reducing material into the exhaust pipe 7 through the needle valve 14a is controlled with the duty ratio of the solenoid coil 37 being controlled by the ECU 16.

Upon de-energization of the solenoid coil 37, the stopper 14f is returned to its original position under a biasing action of a spring 38, so that the needle valve 14a is closed to terminate the introduction of the reducing agent.

The reducing-agent supply device 11 further includes a pump (not shown) and a pressure regulating portion including a pressure regulator 39 (FIG. 2). The pump and the pressure regulating portion are disposed upstream of the supply control valve 14. The pump is provided to pressurize the reducing agent consisting of the mixture of the solid urea 1 and the light oil 2 and deliver the pressurized reducing agent to the pressure regulating portion. The pressure regulator 39 of the pressure regulating portion is arranged to control the pressure of the reducing agent.

On the other hand, the exhaust pipe 7 disposed upstream of the NOx catalytic converter 8 is provided with an incoming-gas temperature sensor 19 for detecting the temperature of the exhaust gas that flows into the NOx catalytic converter 8. The temperature sensor 19 applies to the ECU 16 an output signal having a level proportional to the detected temperature of the incoming exhaust gas.

The exhaust pipe 7 is further provided, at a portion thereof upstream of the incoming-gas temperature sensor 19, with an NOx sensor 21 for measuring the amount of NOx contained in the exhaust gas.

The downstream exhaust pipe 9 disposed downstream of the catalytic converter 8 is provided with an ammonia-gas sensor 36, which applies to the ECU 16 an output signal having a level proportional to the measured amount of ammonia gas. The ammonia-gas sensor 36 is provided to prevent leakage of the ammonia gas. That is, the ECU 16 regulates in a feedback fashion the amount of introduction of the reducing agent including the solid urea, on the basis of the amount of the ammonia gas detected on the basis of the output signal of the ammonia-gas sensor 36, so that the leakage of the ammonia gas into the exhaust pipe 9 is prevented.

The ECU 16 includes a digital computer incorporating a ROM (read-only memory), a RAM (random-access memory), a CPU (central processing unit), an input port and an output port, which are interconnected to each other through a bi-directional bus. The ECU 16 is arranged to perform not only basic engine controls, such as a fuel injection control of the diesel engine 50, but also a reducing-agent introduction control for controlling the reducing-agent supply device 11 to control the introduction of the reducing material including the solid urea 1 into the exhaust pipe 7.

To perform those controls, the ECU 16 receives at its input port an output signal of an air flow meter 20 via an A/D converter. The output signal of the air flow meter 20 has a level proportional to an intake air quantity. The ECU 16 calculates the intake air quantity on the basis of the output signal of the air flow meter 20.

The NOx sensor 21, which is disposed in the exhaust pipe 7 upstream of the NOx catalytic converter 8, detects the concentration of NOx that flows into the NOx catalytic converter 8. The NOx catalytic converter 8 applies to the ECU 16 an output signal having a level proportional to the detected NOx concentration. The ECU 16 calculates the amount of NOx emitted from the diesel engine 50, on the basis of the NOx concentration detected by the NOx sensor 21 and the intake air quantity detected by the air flow meter 20.

On the basis of the amount of NOx calculated as described above, the ECU 16 calculates a desired amount of introduction of the urea (reducing agent including the urea) necessary to reduce or remove the NOx, and calculates a duty ratio of the supply control valve 14 which permits a rate of flow of the reducing agent corresponding to the calculated desired amount of introduction of the urea. The ECU 16 controls the supply control valve 14 at the calculated duty ratio.

In the reducing-agent introduction control, the amount of NOx used to calculate the desired amount of introduction of the urea need not be detected by the NOx sensor 21, but may be estimated from the operating speed of the diesel engine 50 and the opening angle of a throttle valve provided for the engine.

The rate of flow of the reducing material through the supply control valve 14 when operated at a given duty ratio varies depending upon the temperature of the mixture of the urea 1 and the light oil 2, and the back pressure at the output end of the supply control valve 14. In view of this variation, the desired duty ratio of the supply control valve 14 is corrected on the basis of the temperature of the mixture detected by a temperature sensor and the pressure of the exhaust gas detected by an incoming-gas pressure sensor.

The operation of the emission control system for the diesel engine 50 will then be described. As described above, the ECU 16 controls the duty ratio of the supply control valve 14 according to the operating state of the diesel engine 50, that is, according to the amount of NOx produced by the diesel engine 50, to introduce the optimum amount of the reducing agent (i.e., the mixture of the urea 1 and the light oil 2) into the exhaust pipe 7. The reducing agent introduced into the exhaust pipe 7 is heated by the exhaust gas, and is consequently vaporized into a reducing gas (ammonia gas), which flows into the NOx catalytic converter 8, together with the exhaust gas. At this time, the light oil 2 which is a part of the mixture functions to promote the vaporization of the solid urea 1.

The reducing gas reduces or decomposes the NOx contained in the exhaust when the exhaust gas flows through the N Ox catalyst 10 of selective-reduction type. The exhaust gas purified of the NOx is then discharged into the atmosphere through the downstream exhaust pipe 9.

The NOx catalyst 10 of selective-reduction type has an operating characteristic that its NOx removal efficiency is comparatively low when the temperature of the exhaust gas is not higher than a predetermined threshold, and is comparatively high when the temperature of the exhaust gas is higher than the threshold. Therefore, the reducing gas flowing into the NOx catalytic converter 8 when the temperature of the exhaust gas is comparatively low tends to pass through the NOx converter 8 into the atmosphere, without undergoing a reducing reaction with the NOx. In view of this tendency, the ECU 16 is adapted, in this embodiment, to hold the supply control valve 14 in the fully closed state to inhibit the introduction of the reducing agent and thereby prevent otherwise possible leakage of the reducing gas, while the temperature of the exhaust gas detected by the incoming-gas temperature sensor 19 is not higher than the predetermined threshold.

In the present embodiment, the amount of NOx produced by the diesel engine 50 is calculated on the basis of the NOx concentration detected by the NOx sensor 21 disposed at the exhaust pipe 7 upstream of the NOx catalytic converter 8 and the intake air quantity detected by the air flow meter 20. However, the NOx amount produced by the diesel engine 50 may be obtained in the following manner. Namely, experimentation is conducted to obtain a relationship between the NOx amount produced by the engine 50 and an operating condition of the engine 50 as represented by the engine load and speed. A data map representative of the thus obtained relationship is stored in the ROM of the ECU 16. In operation of the emission control system, the ECU 16 calculates the NOx amount produced by the engine 50, on the basis of the detected engine load and speed, and according to the stored data map. In this case, the ECU 16 receives through its input port an output signal of an accelerator pedal sensor (not shown) and an output signal of a crank-angle sensor (not shown). The output voltage of the accelerator pedal sensor is proportional to the operating amount of the accelerator pedal, and the ECU 16 calculates the engine load on the basis of the output signal of the accelerator pedal sensor. The crank-angle sensor generates an output pulse for a predetermined angle of rotation of the crankshaft of the diesel engine 50, and the ECU 16 calculates the engine speed on the basis of the output pulses generated by the crank-angle sensor.

In the present embodiment, the reducing agent is a fluidized mass consisting of a mixture of the solid urea 1 and a water-insoluble liquid in the form of the light oil 2. Like a liquid reducing agent, the fluidized reducing agent used in this embodiment can be stored without agglomeration, and the amount of introduction of the reducing agent into the exhaust pipe 7 can be controlled as desired by controlling the rate of flow through the supply control valve 14.

Further, the supply control valve 14 constructed as described above permits a sufficiently high degree of accuracy of control of the flow rate of the reducing material, which is a fluidized mixture of a solid (solid urea 1) and a liquid (light oil 2), rather than a gas.

Although the present embodiment is adapted to introduce into the exhaust pipe of the internal combustion engine the reducing agent in the form of a mixture of a solid reducing material (solid urea 1) and a water-insoluble liquid (light oil 2), it is possible to introduce a reducing agent in the form of liquid urea, which is prepared by liquefying a solid urea substance under heat. Thus, the liquid urea serving as a reducing agent may be injected into the exhaust pipe. In this case, the reducing-agent supply device 11 further includes a urea storage container that is disposed below the storage container 12 for storing the mixture of the solid urea 1 and the light oil 2. The solid urea 1 fed from the storage container 12 is liquefied and is stored in the urea storage container.

The urea storage container indicated above incorporates a heat-generating source such as an electric heater (not shown). The operation of the heat-generating source is controlled by the ECU 16, to maintain the temperature in the urea storage container within a predetermined optimum range (e.g., from about 160° C. to about 230° C.) suitable for holding the urea in a liquid state. In this respect, it is noted that the solid urea may be gasified if the temperature in the urea storage container 15 is higher than the upper limit of the predetermined optimum range.

Between the supply control device 14 and the urea storage container for storing the liquid urea, there are provided a pump (not shown) and a pressure regulating portion including a pressure regulator. The pump is provided to pressurize the liquid urea and deliver the pressurized liquid urea to the pressure regulating portion. The pressure regulator of the pressure regulating portion is arranged to control the pressure of the liquid urea.

The urea storage container that contains the liquid urea is provided with a temperature sensor for detecting the temperature of the liquid urea. The temperature sensor applies to the ECU 16 an output signal having a level proportional to the detected temperature of the liquid urea.

Second Embodiment

In the second embodiment, a solid reducing material (solid urea) included in a mixture of the solid reducing material and a water-insoluble liquid is separated from the water-insoluble liquid and is gasified into a gaseous reducing agent to be sprayed into the exhaust passage. In this case, the mixture is subjected to a separating operation using a screen that prevents the solid reducing material from passing therethrough, so that the solid reducing material and the water-insoluble liquid are separated from each other. The solid reducing material thus obtained is stored in a storage tank communicating with an injector valve, and is heated therein at a temperature suitable for gasification. The thus gasified reducing agent is sprayed through the injector valve into the exhaust passage, to be added to the exhaust gas.

In the present embodiment, the solid reducing material (solid urea) is stored as a fluidized mixture with a water-insoluble liquid, so that the solid reducing material in a powdered form will not be agglomerated into a large solid mass, and the fluidized mixture has a high degree of mobility. Further, the fluidity of the mixture including the solid reducing material permits easy control of the amount of introduction of the solid reducing material into the exhaust passage.

Third Embodiment

Figure 4:
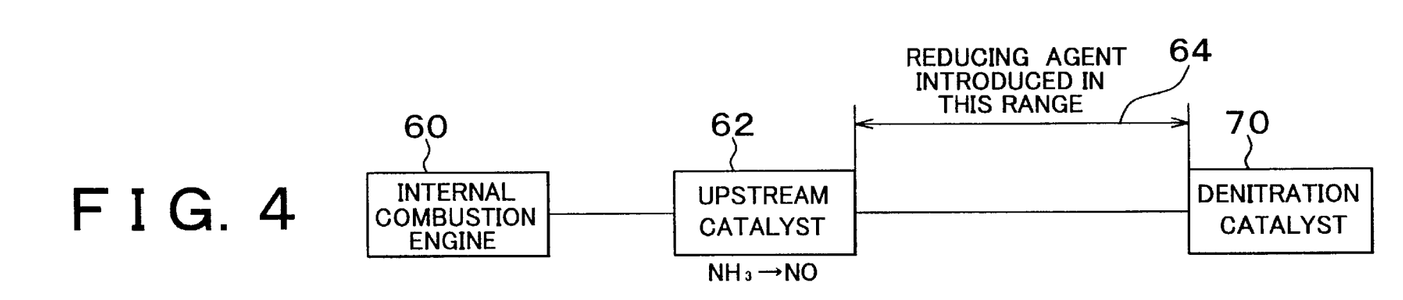
FIG. 4 is a view showing an example of an exhaust passage in which a denitration catalyst is disposed downstream of an upstream catalyst.

Referring to FIG. 4, there is shown an example of an exhaust passage for discharging an exhaust gas emitted from an internal combustion engine 60, wherein a denitration catalyst 70 is disposed downstream of an upstream catalyst 62. The upstream catalyst 62 is generally disposed upstream of the denitration catalyst, and is capable of oxidizing HC and CO at a temperature lower than a temperature of activation of the denitration catalyst 70.

The upstream catalyst 62, which is located in a relatively upstream portion of the exhaust passage, also functions to activate the denitration catalyst 70 at an earlier point of time. If urea as a reducing agent is introduced into a portion of the exhaust passage upstream of the oxidizing upstream catalyst, $NH_3$ will be oxidized into NO during passage of $NH_3$ through the oxidizing catalyst.

Accordingly, the introduction of the reducing agent upstream of the oxidizing upstream catalyst does not achieve intended removal of NOx from the exhaust gas. In view of this, the reducing agent is introduced into a portion 64 of the exhaust passage between the upstream catalyst 62 and the denitration catalyst 70, where the upstream catalyst 62 is disposed upstream of the denitration catalyst 70.

Fourth Embodiment

Figure 5:
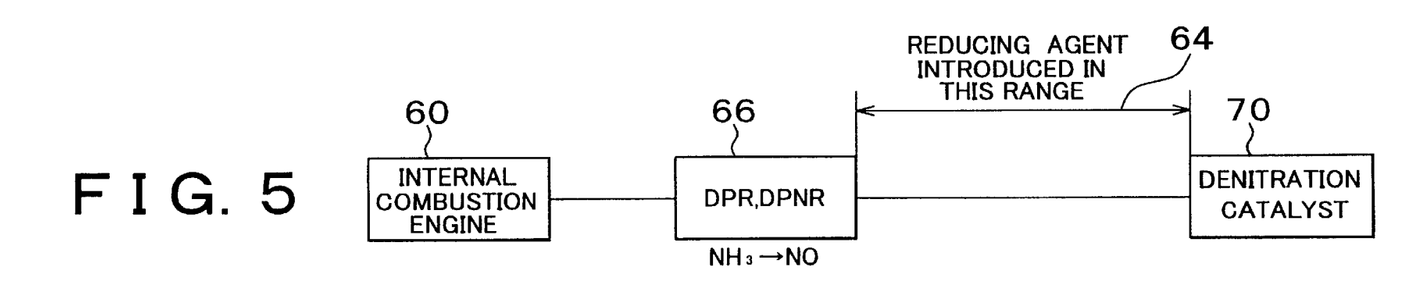
FIG. 5 is a view showing an example of an exhaust passage in which a denitration catalyst is disposed downstream of a DPR or DPNR.

Referring to FIG. 5, there is shown an example of an exhaust passage of an internal combustion engine 60, in which a DPR or DPNR 66 is provided. The DPR or DPNR includes a particulate filter that carries an active-oxygen releasing agent, and serves to oxidize particulate matters deposited thereon. Furthermore, the DPR or DPNR is capable of absorbing NOx when the exhaust gas has a lean air/fuel ratio, and releasing the absorbed NOx for reduction into $N_2$ when the oxygen concentration of the exhaust gas is lowered.

If urea as a reducing agent is introduced into a portion of the exhaust passage upstream of an oxidizing catalyst as part of the DPR or DPNR, $NH_3$ will be oxidized into NO during passage through the oxidizing catalyst.

Accordingly, the introduction of the reducing agent upstream of the oxidizing catalyst as part of the DPR or DPNR does not achieve intended removal of NOx from the exhaust gas. In view of this, the reducing agent is introduced into a portion 64 of the exhaust passage between the DPR or DPNR 66 and the denitration catalyst 70, where the DPR or DPNR 66 is disposed upstream of the denitration catalyst 70.

Fifth Embodiment

Figure 6:
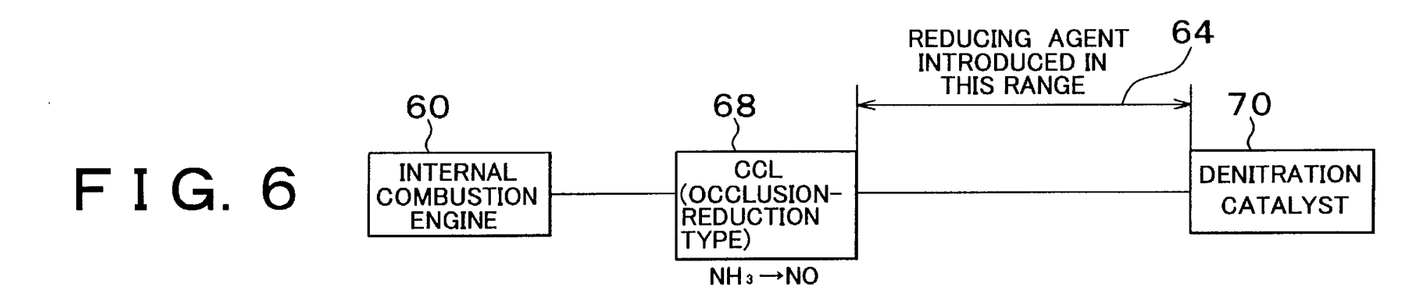
FIG. 6 is a view showing an example of an exhaust passage in which a denitration catalyst is disposed downstream of an occlusion-reduction type NOx catalyst.

Referring to FIG. 6, there is shown an example of an exhaust passage of an internal combustion engine 60, in which a denitration catalyst 70 is disposed downstream of a NOx catalyst 68 of occlusion-reduction type. For example, the occlusion-reduction type NOx catalyst 68 includes (a) a substrate formed of alumina ($Al_2O_3$), for example; (b) at least one element carried on the substrate and selected from alkali metals, such as potassium (K), sodium (Na), lithium (Li) and cesium (Sc); alkali earth metals, such as barium (Ba) and calcium (Ca); and rare earth metals, such as lanthanum (La) and yttrium (Y); and (c) at least one noble metal such as platinum (Pt) also carried on the substrate. The occlusion-reduction type NOx catalyst is capable of absorbing nitrogen oxides (NOx) in the exhaust gas when the exhaust gas has a lean air/fuel ratio, and releasing the absorbed NOx for reduction when the oxygen concentration of the exhaust gas is lowered in the presence of the reducing agent.

The NOx catalyst 68 of occlusion-reduction type is disposed in a relatively upstream portion of the exhaust passage. If urea as a reducing agent is introduced into a portion of the exhaust passage upstream of the NOx catalyst, $NH_3$ will be oxidized into NO during passage through the NOx catalyst.

Accordingly, the introduction of the reducing agent upstream of the NOx catalyst does not achieve intended removal of NOx from the exhaust gas. In view of this, the reducing agent is introduced into a portion 64 of the exhaust passage between the NOx catalyst 68 of occlusion-reduction type and the denitration catalyst 70, where the NOx catalyst 68 is disposed upstream of the denitration catalyst 70.

Sixth Embodiment

Figure 7:
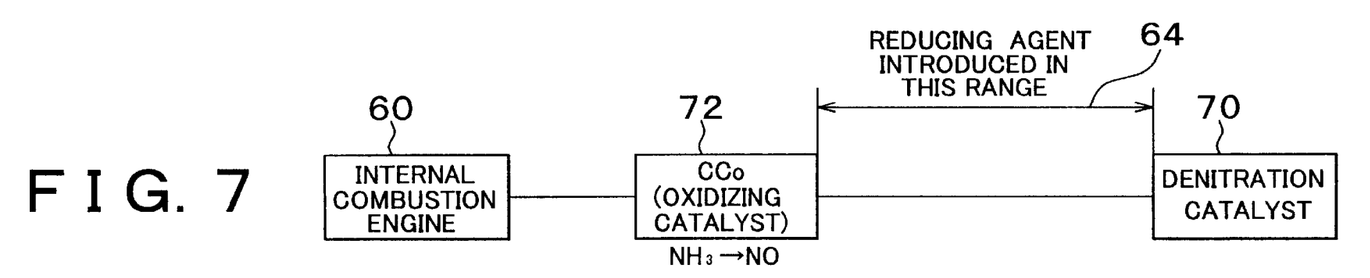
FIG. 7 is a view showing an example of an exhaust passage in which a denitration catalyst is disposed downstream of an oxidizing catalyst.

Referring to FIG. 7, there is shown an example of an exhaust passage of an internal combustion engine 60, in which a denitration catalyst 70 is disposed downstream of an oxidizing catalyst 72. The oxidizing catalyst 72 is arranged to oxidize CO and HC in the exhaust gas, into harmless carbon dioxide and water vapor.

Thus, the oxidizing catalyst 72 is disposed in a relatively upstream portion of the exhaust passage. If urea as a reducing agent is introduced into a portion of the exhaust passage upstream of the oxidizing catalyst, $NH_3$ will be oxidized into NO during passage through the NOx catalyst.

Accordingly, the introduction of the reducing agent upstream of the oxidizing catalyst 72 does not achieve intended removal of NOx from the exhaust gas. In view of this, the reducing agent is introduced into a portion 64 of the exhaust passage between the oxidizing catalyst 72 and the denitration catalyst 70, where the oxidizing catalyst 72 is disposed upstream of the denitration catalyst 70.

Seventh Embodiment

Figure 8:
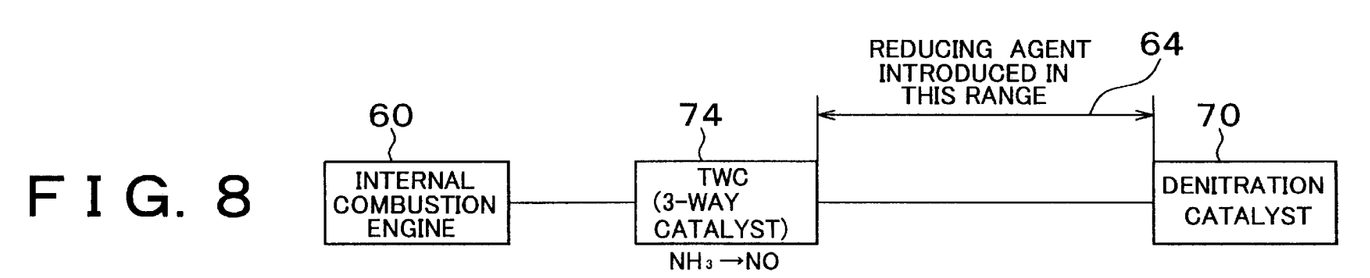
FIG. 8 is a view showing an example of an exhaust passage in which a denitration catalyst is disposed downstream of a three-way catalyst.

Referring to FIG. 8, there is shown an example of an exhaust passage of an internal combustion engine 60, in which a denitration catalyst 70 is disposed downstream of a three-way catalyst (TWC) 74. The three-way catalyst 74 is capable of simultaneously effecting oxidization of CO and HC into carbon dioxide and water vapor and reduction of NOx into nitrogen.

The three-way catalyst 74 is disposed in a relatively upstream portion of the exhaust passage. If urea as a reducing agent is introduced into a portion of the exhaust passage upstream of the three-way catalyst, $NH_3$ will be oxidized into NO during passage through the three-way catalyst.

Accordingly, the introduction of the reducing agent upstream of the three-way catalyst 74 does not achieve intended removal of NOx from the exhaust gas. In view of this, the reducing agent is introduced into a portion 64 of the exhaust passage between the three-way catalyst 74 and the denitration catalyst 70, where the three-way catalyst 74 is disposed upstream of the denitration catalyst 70.

Eighth Embodiment

Figure 9:
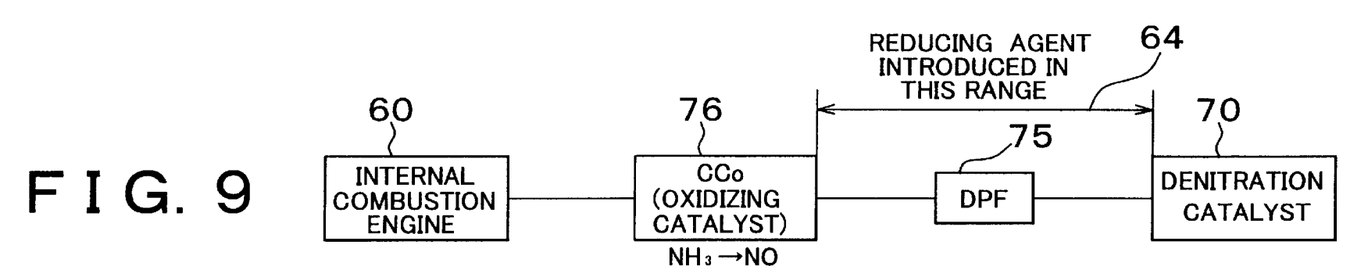
FIG. 9 is a view showing an example of an exhaust passage in which a denitration catalyst is disposed downstream of a DPF (Diesel Particulate filter) which is disposed downstream of an oxidizing catalyst.

Referring to FIG. 9, there is shown an example of an exhaust passage of an internal combustion engine 60, in which a DPF (Diesel Particulate Filter) 75 is disposed downstream of an oxidizing catalyst 76, and a denitration catalyst 70 is disposed downstream of the DPF. The oxidizing catalyst 76 may be carried by the DPF. In this case, a reducing agent within the DPF actively reacts with oxygen, so that the temperature of the substrate of the DPF can be raised at a high rate, promoting the burning of particulate matters.

However, the introduction of urea as a reducing agent into a portion of the exhaust passage upstream of the oxidizing catalyst 76 would oxidize $NH_3$ into NO during passage of $NH_3$ through the oxidizing catalyst.

Accordingly, the introduction of the reducing agent upstream of the oxidizing catalyst 76 does not achieve intended removal of NOx from the exhaust gas. In view of this, the reducing agent is introduced into a portion 64 of the exhaust passage between the oxidizing catalyst 76 and the denitration catalyst 70, where the oxidizing catalyst 76 is disposed upstream of the denitration catalyst 70.

Ninth Embodiment

Figure 10:
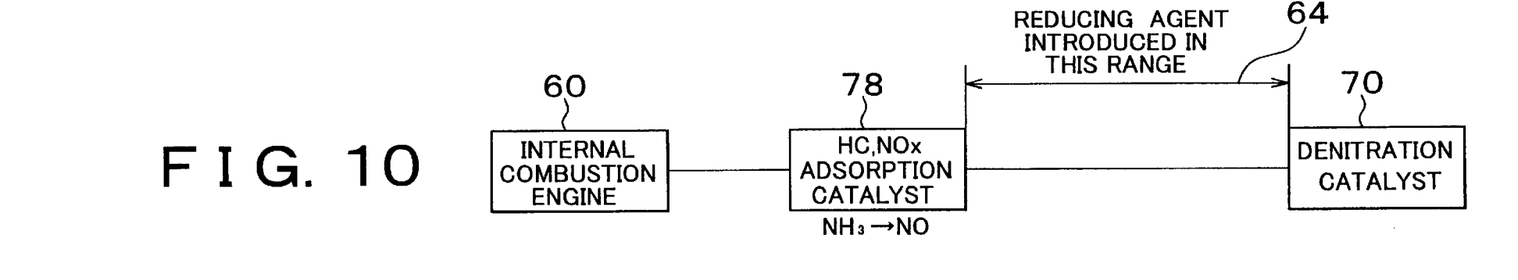
FIG. 10 is a view showing an example of an exhaust passage in which a denitration catalyst is disposed downstream of a HC/NOx adsorption catalyst.

Referring to FIG. 10, there is shown an example of an exhaust passage of an internal combustion engine 60, in which a denitration catalyst 70 is disposed downstream of a HC/NOx adsorption catalyst 78. The HC/NOx adsorption catalyst 78 is provided to keep adsorbing HC and NOx for preventing passage of HC and NOx through the denitration catalyst 70 into the atmosphere, at least until the denitration catalyst disposed downstream of the HC/NOx adsorption catalyst is activated.

Because $NH_3$ is oxidized into NO during passage of $NH_3$ through the adsorption catalyst, the introduction of urea as a reducing agent into a portion of the exhaust passage upstream of the adsorption catalyst does not achieve intended removal of NOx from the exhaust gas. In view of this, the reducing agent is introduced into a portion 64 of the exhaust passage between the adsorption catalyst 78 and the denitration catalyst 70, where the adsorption catalyst is disposed upstream of the denitration catalyst.

Tenth Embodiment

Figure 11:
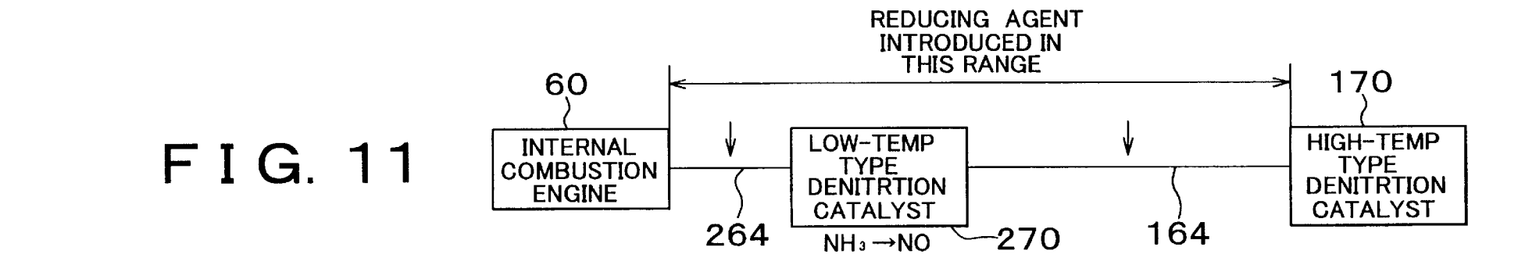
FIG. 11 is a view showing an example of an exhaust passage in which a high-temperature type denitration catalyst is disposed downstream of a low-temperature type denitration catalyst.

Referring to FIG. 11, there is shown an example of an exhaust passage of an internal combustion engine 60, in which a denitration catalyst 170 of high-temperature type is disposed downstream of a denitration catalyst 270 of low-temperature type.

In the present embodiment, a reducing agent is introduced into a portion 264 of the exhaust passage upstream of the low-temperature type denitration catalyst 270 where the low-temperature denitration catalyst is used, and into a portion 164 of the exhaust passage upstream of the high-temperature denitration catalyst 170 where the high-temperature denitration catalyst is used. Where the two denitration catalysts are used, the reducing agent is introduced in the respective portions 264, 164 of the exhaust passage which are upstream of the respective two denitration catalysts 270, 170.

Eleventh Embodiment

Figure 12:
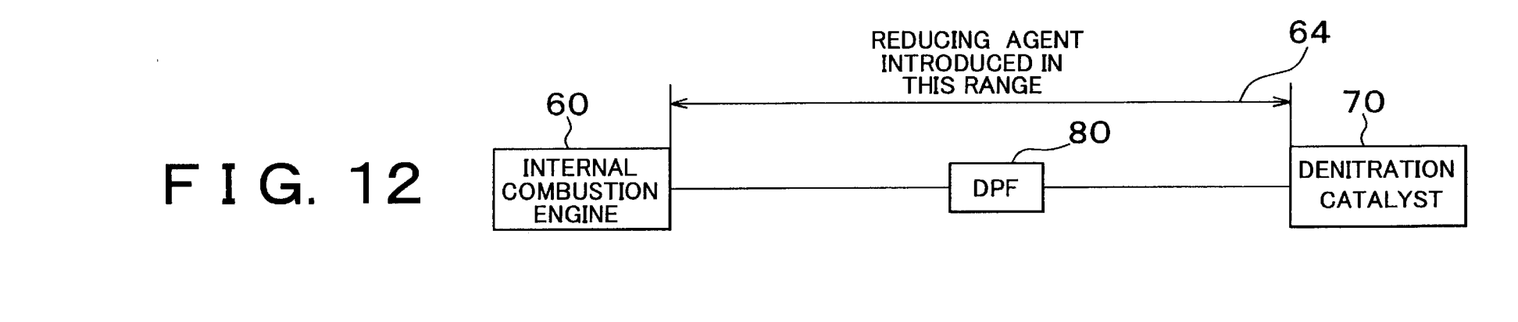
FIG. 12 is a view showing an example of an exhaust passage in which a denitration catalyst is disposed downstream of a DPF.

Referring to FIG. 12, there is shown an example of an exhaust passage of an internal combustion engine 60, in which a denitration catalyst 70 is disposed downstream of a DPF 80. The DPF 80 is generally arranged to merely remove particulate matters from the exhaust gas, without oxidization of $NH_3$. In the present embodiment, therefore, urea serving as a reducing agent is introduced into a portion 64 of the exhaust passage between the internal combustion engine 60 and the denitration catalyst 70. Alternatively, the DPF may be disposed downstream of the denitration catalyst.

As described above, the portion of the exhaust passage into which the reducing agent is introduced is selected depending upon the positions of the catalysts, so that $NH_3$ reaches the denitration catalyst, without oxidization of $NH_3$ into NO, whereby the exhaust gas can be purified of NOx.

Twelfth Embodiment

In the embodiment of FIGS. 1–3, the NOx catalyst 10 of selective-reduction type is contained in the NOx catalytic converter 8. However, a denitration catalyst may be contained in the NOx catalytic converter 8. The denitration catalyst is arranged to induce a reaction between NOx and ammonia ($NH_3$), for promoting the conversion of NOx into nitrogen ($N_2$). For instance, the denitration catalyst includes a substrate formed of titania, and a molybdenum oxide or vanadium oxide carried on the titania substrate.

Figure 13:
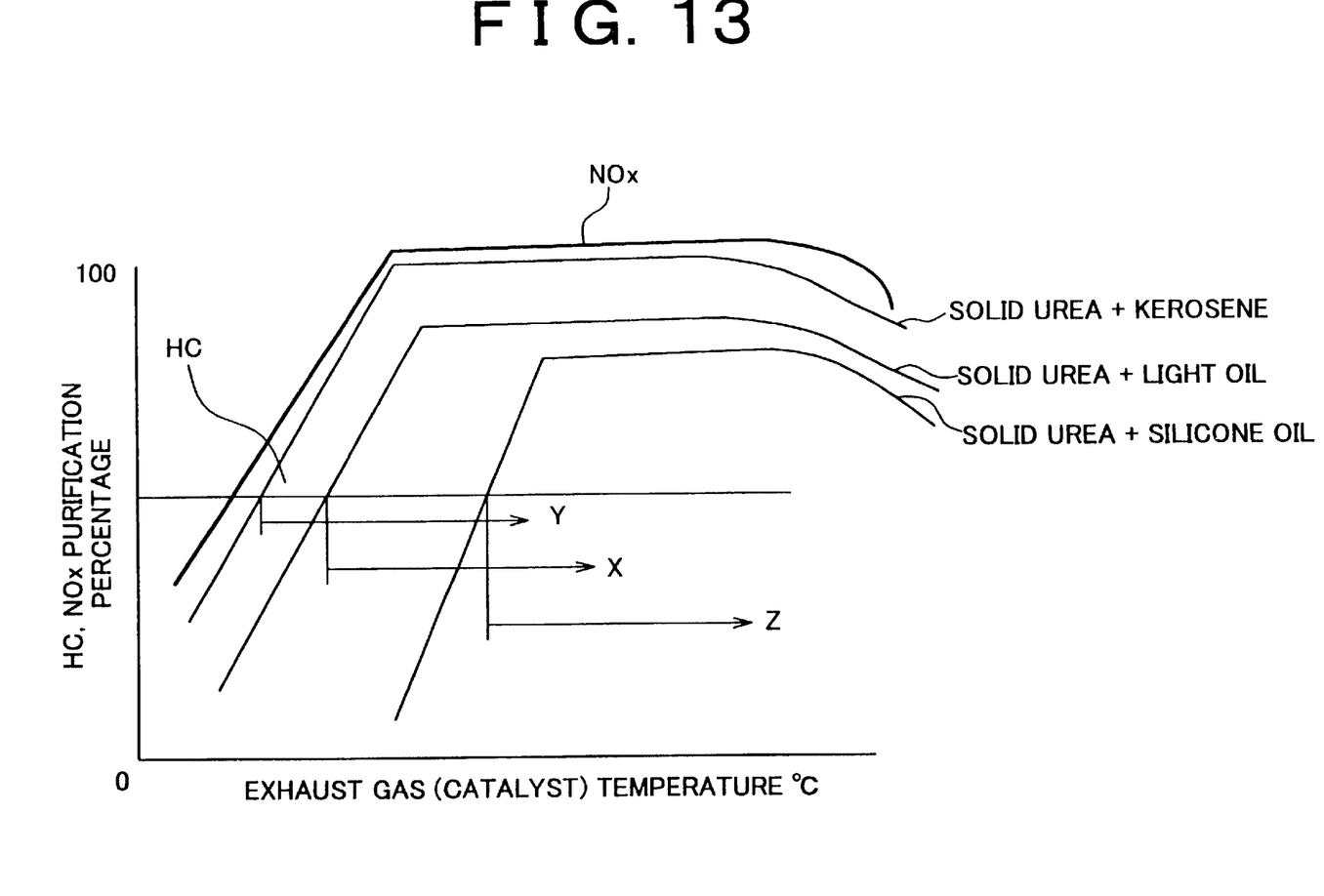
FIG. 13 is a view indicating a relationship between exhaust gas temperature (catalyst temperature) and purification percentage.

In the present embodiment, the reducing agent is introduced into the exhaust passage when the temperature of the exhaust gas (denitration catalyst) has exceeded a temperature above which the purification percentages of HC and NOx and the purification percentage of the mixture of the solid urea and the light oil are all higher than a predetermined threshold, for instance, about 50%, as indicated in the graph of FIG. 13.

Described in detail, the temperature of the exhaust gas (denitration catalyst) is detected by the incoming-gas temperature sensor 19, and the purification percentage of the water-insoluble liquid (light oil) and the purification percentages of HC and NOx are estimated on the basis of the temperature of the exhaust gas. When the estimated purification percentages of the water-insoluble liquid, HC and NOx are all higher than the predetermined threshold, the reducing agent is introduced into the exhaust passage. That is, the introduction of the reducing agent is carried out at a temperature of the exhaust gas at which the three purification percentages as indicated above are all higher than the predetermined threshold.

In the present embodiment, the temperature of the substrate of the denitration catalyst is supposed to be equal to the temperature of the exhaust gas, and data maps representative of known relationships between the temperature of the denitration catalyst (exhaust gas) and the purification percentages of the mixture of the solid urea and the light oil, HC and NOx are stored in the ROM of the ECU 16.

After the engine 50 is started, the temperature of the denitration catalyst is detected on the basis of the output signal of the incoming-gas temperature sensor 19, and the purification percentages indicated above are obtained on the basis of the detected temperature and according to the stored data maps representative of the relationships between the temperature and the purification percentages as indicated in FIG. 13. When the obtained purification percentages have all exceeded the predetermined threshold, the introduction of the reducing agent is initiated. In the present embodiment in which the mixture of the solid urea and the light oil is used, the introduction of the reducing agent is initiated when the detected temperature has exceeded a threshold value above which the purification percentages of the light oil, HC and NOx are all higher than the threshold value of about 50%, as indicated by arrow X in FIG. 13.

In the present embodiment, the ECU 16 holds the supply control valve 14 in the fully closed state to inhibit the introduction of the reducing agent including urea, for thereby preventing leakage of the reducing gas into the atmosphere, while the temperature of the exhaust gas (denitration catalyst) detected by the incoming-gas temperature sensor 19 is not higher than the above-indicated threshold value.

The present embodiment using the mixture of the solid urea 1 and the water-insoluble liquid 2, which is a fluidic or fluidized mass, permits a high degree of accuracy of control of the flow rate of the reducing agent by the supply control valve 14.

Thirteenth Embodiment

The present embodiment is also adapted to use the emission control system as used in the first embodiment and as shown in FIG. 2, for introducing a reducing agent including urea into the exhaust pipe 7. In this embodiment, however, the emission control system uses kerosene as a water-insoluble liquid contained in the reducing agent, so that a mixture of the solid urea 1 and the kerosene is introduced as the reducing agent into the exhaust pipe 7.

As in the twelfth embodiment, the introduction of the reducing agent comprising the mixture of the solid urea and the kerosene is initiated when the purification percentages of the mixture, HC and NOx have all exceeded the predetermined threshold.

Namely, the introduction of the reducing agent is initiated when the detected temperature of the exhaust gas (denitration catalyst) has exceeded a threshold value above which the purification percentages of the kerosene, HC and NOx are all higher than the threshold value of about 50%, as indicated by arrow Y in FIG. 13.

Fourteenth Embodiment

The present embodiment is also adapted to use the emission control system as used in the first embodiment and as shown in FIG. 2, for introducing a reducing agent including urea into the exhaust pipe 7. In this embodiment, however, the emission control system uses silicone oil as a water-insoluble liquid included in the reducing agent, so that a mixture of the solid urea 1 and the silicone oil is introduced as the reducing agent into the exhaust pipe 7.

As in the twelfth embodiment, the introduction of the reducing agent comprising the mixture of the solid urea and the silicone oil is initiated when the purification percentages of the mixture, HC and NOx have all exceeded the predetermined threshold.

Namely, the introduction of the reducing agent is initiated when the detected temperature of the exhaust gas (denitration catalyst) has exceeded a threshold value above which the purification percentages of the silicone oil, HC and NOx are all higher than the threshold value of about 50%, as indicated by arrow Z in FIG. 13.

Thus, the reducing agent is introduced into the exhaust passage only after the temperature of the exhaust gas has been raised to a value at which the purification percentage of the water-insoluble liquid is sufficiently high, so that the introduction of the reducing agent including a solid reducing material (e.g., urea) permits effective reduction or removal of NOx, while preventing deterioration of the exhaust emission of the internal combustion engine.

What is claimed is:

1. A reducing-agent supply device for an internal combustion engine, for supplying a denitration catalyst with a reducing agent, wherein:

the reducing agent comprises a mixture of an ammonia-derived, solid reducing material and a water-insoluble liquid;

the reducing-agent supply device is operable to introduce the reducing agent into a portion of an exhaust passage of the internal combustion engine that is upstream of the denitration catalyst;

a catalyst that converts $NH_3$ into NO is disposed in a first portion of the exhaust passage that is between the internal combustion engine and the denitration catalyst; and the reducing-agent supply device is operable to introduce the reducing agent into a second portion of the exhaust passage that is between the catalyst and the denitration catalyst.

2. A reducing-agent supply device for an internal combustion engine, for supplying a denitration catalyst with a solid reducing agent, wherein:

the solid reducing agent comprises a mixture of an ammonia-derived, solid reducing material and a water-insoluble liquid;

the reducing agent supply device is operable to introduce the solid reducing agent into a portion of an exhaust passage of the internal combustion engine that is upstream of the denitration catalyst;

a catalyst that converts $NH_3$ into NO is disposed in a first portion of the exhaust passage that is between the internal combustion engine and the denitration catalyst; and the reducing-agent supply device is operable to introduce the solid reducing agent into a second portion of the exhaust passage that is between the catalyst and the denitration catalyst.

3. The reducing-agent supply device according to claim 2, which is operable to introduce the solid reducing agent into a portion of the exhaust passage between the internal combustion engine and the denitration catalyst when only the denitration catalyst is provided in the exhaust passage.

4. A reducing-agent supply device for an internal combustion engine including an exhaust passage, comprising:

a container for storing a reducing agent comprising a mixture of an ammonia-derived, solid reducing material and a water-insoluble liquid; and a supply control valve that is connected to the container via a communication passage, the supply control valve being operable to inject a controlled amount of the reducing agent into the exhaust passage of the internal combustion engine, wherein the reducing-agent supply device introduces the reducing agent into the exhaust passage when a first purification percentage representing a capability of the denitration catalyst to remove the water-insoluble liquid is greater than a first threshold value.

5. A method of reducing or removing NOx in an exhaust gas contained in an exhaust passage of an internal combustion engine, comprising:

placing a denitration catalyst that reduces or decomposes NOx in the exhaust passage of the internal combustion engine; and introducing a controlled amount of the reducing agent, wherein the reducing agent includes a mixture of an ammonia-derived, solid reducing material and a water-insoluble liquid in which the solid reducing agent is immersed wherein the mixture has a temperature that is lower than a temperature above which the solid reducing material is fused and the temperature of the mixture is lower than a lower one of a boiling point of the water-insoluble liquid and a fusing point of the solid reducing material, into the exhaust passage upstream of the denitration catalyst and when a first purification percentage representing a capability of the denitration catalyst to remove the water-insoluble liquid is greater than a first threshold value.

6. The method according to claim 5, comprising introducing the reducing agent into the exhaust passage when a second purification percentage representing a capability of the denitration catalyst to remove HC, and a third purification percentage representing a capability of the denitration catalyst to remove NOx, are greater than respective second and third thresholds.

7. The method according to claim 5, further comprising:

detecting an amount of ammonia gas in the exhaust passage downstream of the denitration catalyst; and correcting the controlled amount of the reducing agent based on the detected amount of ammonia gas.

8. An internal combustion engine, comprising:

an exhaust passage; and an emission control system including:

a denitration catalyst disposed in the exhaust passage to reduce or decompose NOx; and a reducing-agent supply device disposed near the exhaust passage, the reducing-agent supply device being operable to introduce a controlled amount of a reducing agent into the exhaust passage for use with the denitration catalyst, the reducing agent comprising a mixture of an ammonia-derived, solid reducing material and a water-insoluble liquid, wherein the reducing-agent supply device introduces the reducing agent into the exhaust passage when a first purification percentage representing a capability of the denitration catalyst to remove the water-insoluble liquid is greater than a first threshold value.

9. The internal combustion engine according to claim 8, wherein the reducing-agent supply device introduces the reducing agent into the exhaust passage when a second purification percentage representing a capability of the denitration catalyst to remove HC, and a third purification percentage representing a capability of the denitration catalyst to remove NOx, are greater than respective second and third thresholds.

10. The internal combustion engine according to claim 8, wherein the emission control system further including:

an ammonia sensor disposed downstream of the denitration catalyst; and a controller that corrects the controlled amount of the reducing agent, based on a detection value of the ammonia sensor.

11. An emission control system for an internal combustion engine including an exhaust passage, wherein:

an ammonia-derived reducing agent is used for a denitration catalyst disposed in the exhaust passage of the internal combustion engine for reducing or decomposing Nox, the reducing agent comprising a mixture of an ammonia-derived, solid reducing material formed in a predetermined size and a water-insoluble liquid in which the solid reducing material is immersed; and the reducing agent is introduced into the exhaust passage when a capability of removing the water-insoluble liquid is within a predetermined range.

12. The emission control system according to claim 11, further comprising:

an ammonia sensor disposed downstream of the denitration catalyst; and a controller that corrects a controlled amount of the reducing agent, based on a detection value of the ammonia sensor.

13. An emission control system for an internal combustion engine including an exhaust passage, comprising:

a denitration catalyst disposed in the exhaust passage of the internal combustion engine, to reduce or decompose NOx; and a reducing-agent supply device disposed near the exhaust passage, the reducing-agent supply device being operable to introduce a controlled amount of a reducing agent into the exhaust passage for use with the denitration catalyst, the reducing agent comprising a mixture of an ammonia-derived, solid reducing material and a water-insoluble liquid, wherein the reducing-agent supply device introduces the reducing agent into the exhaust passage when a first purification percentage representing a capability of the denitration catalyst to remove the water-insoluble liquid is greater than a first threshold value.

14. An emission control system according to claim 13, further comprising:

an ammonia sensor disposed downstream of the denitration catalyst; and a controller that corrects the controlled amount of the reducing agent, based on a detection value of the ammonia sensor.

15. An emission control system for an internal combustion engine including an exhaust passage, comprising:

a denitration catalyst disposed in the exhaust passage of the internal combustion engine, to reduce or decompose NOx; and a reducing-agent supply device disposed near the exhaust passage, the reducing-agent supply device being operable to introduce a controlled amount of a reducing agent into the exhaust passage for use with the denitration catalyst, the reducing agent comprising a mixture of an ammonia-derived, solid reducing material and a water-insoluble liquid, wherein the reducing-agent supply device introduces the reducing agent into the exhaust passage when a second purification percentage representing a capability of the denitration catalyst to remove HC, and a third purification percentage representing a capability of the denitration catalyst to remove NOx, are greater than respective second and third thresholds.

16. The emission control system according to claim 15, wherein the reducing-agent supply device introduces the reducing agent into the exhaust passage when a first purification percentage representing a capability of the denitration catalyst to remove the water-insoluble liquid is greater than a first threshold value.

17. The emission control system according to claim 15, further comprising:

an ammonia sensor disposed downstream of the denitration catalyst; and a controller that corrects the controlled amount of the reducing agent, based on a detection value of the ammonia sensor.

\* \* \* \* \*